United States Patent [19]

Struble

[11] 4,322,000
[45] Mar. 30, 1982

[54] TAPE CASSETTE PACKAGES AND HOLDERS THEREFOR

[75] Inventor: Glenn E. Struble, Osford, Ohio

[73] Assignee: Diamond International Corporation

[21] Appl. No.: 177,671

[22] Filed: Aug. 13, 1980

[51] Int. Cl.³ .................... B65D 85/67; B65D 85/672
[52] U.S. Cl. .................................. 206/387; 220/339; 229/19
[58] Field of Search ............ 206/387, 310, 396, 395, 206/309; 229/9, 19; 220/339

[56] References Cited

U.S. PATENT DOCUMENTS

| | | | |
|---|---|---|---|
| 2,500,773 | 3/1950 | Robins | 206/310 |
| 2,615,564 | 10/1952 | Post | 206/59 |
| 2,765,907 | 10/1956 | Dunning et al. | 206/52 |
| 2,818,974 | 1/1958 | Talbot | 206/65 |
| 2,938,625 | 5/1960 | Browning et al. | 206/65 |
| 3,204,851 | 9/1965 | Rouder et al. | 229/19 |
| 3,229,812 | 1/1966 | Metzger | 206/58 |
| 3,233,728 | 2/1966 | Johnson et al. | 206/52 |
| 3,246,742 | 4/1966 | Coe | 206/58 |
| 3,258,116 | 6/1966 | Goerke | 206/65 |
| 3,272,325 | 9/1966 | Schoenmakers | 206/52 |
| 3,319,866 | 5/1967 | Kitchell | 229/14 |
| 3,332,600 | 7/1967 | Guernsey | 229/20 |
| 3,381,810 | 5/1968 | Lasher et al. | 206/52 |
| 3,621,995 | 11/1971 | Francis | 206/65 |
| 3,684,084 | 8/1972 | Kanzelberger | 206/45 |
| 3,743,374 | 7/1973 | Glass | 312/319 |
| 3,747,745 | 7/1973 | Esashi et al. | 206/52 |
| 3,754,639 | 8/1973 | Gellert | 206/1 |
| 3,763,994 | 10/1973 | Somers | 206/1 |
| 3,823,864 | 7/1974 | Ohkubo | 229/19 |
| 3,876,071 | 4/1975 | Neal et al. | 206/387 |
| 3,931,889 | 1/1976 | Roccaforte | 206/493 |
| 3,949,928 | 4/1976 | Perkins | 229/19 |
| 3,990,574 | 11/1976 | Roccaforte | 206/396 |
| 3,994,551 | 11/1976 | Ackeret | 312/319 |
| 4,011,940 | 3/1977 | Neal et al. | 206/1.5 |
| 4,030,601 | 6/1977 | Kusnacht | 206/387 |
| 4,054,206 | 10/1977 | Kobayashi et al. | 206/387 |
| 4,078,657 | 3/1978 | Schurman | 206/387 |
| 4,102,452 | 6/1978 | Sato et al. | 206/387 |
| 4,119,200 | 10/1978 | Cassidy et al. | 206/387 |
| 4,125,189 | 11/1978 | Fujimoto et al. | 206/387 |
| 4,131,197 | 12/1978 | Blankenmeister et al. | 206/387 |
| 4,140,219 | 2/1979 | Somers | 206/387 |

*Primary Examiner*—William T. Dixson, Jr.
*Attorney, Agent, or Firm*—Karl W. Flocks

[57] ABSTRACT

A tape cassette holder and the combination thereof with an outer sleeve extending therearound wherein the cassette holder comprises:
(a) an open pocket portion for receiving a tape cassette at the edge along which tape is exposed,
(b) a back flap, and
(c) reel-engaging-and-locking members extending forwardly from the back flap in the area of at least one reel hole of a tape cassette to be received in the pocket portion; wherein the pocket portion, the back flap, and the reel-engaging-and-locking members are integrally formed from a single sheet member; the pocket portion includes a bottom wall, two side walls, a front wall, and a back wall; the two side walls and the front wall extend up from the bottom wall to an elevation below that of the reel holes of a cassette to be received in the pocket portion; the back wall and the back flap are integral with each other along a hinge line at about the same elevation that the two side walls and the front wall are above the bottom wall; and the reel-engaging-and-locking members are deflected under pressure as cup-shaped members or partially cut out from the back flap and bent forwardly therefrom; and said back flap may be hinged to and from the plane of the back wall about the hinge line for insertion and withdrawal of the reel-engaging-and-locking members with respect to one or more reel holes in registration therewith.

10 Claims, 6 Drawing Figures

U.S. Patent  Mar. 30, 1982  4,322,000
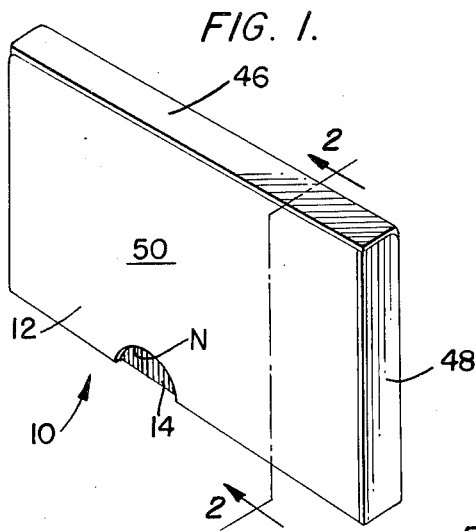
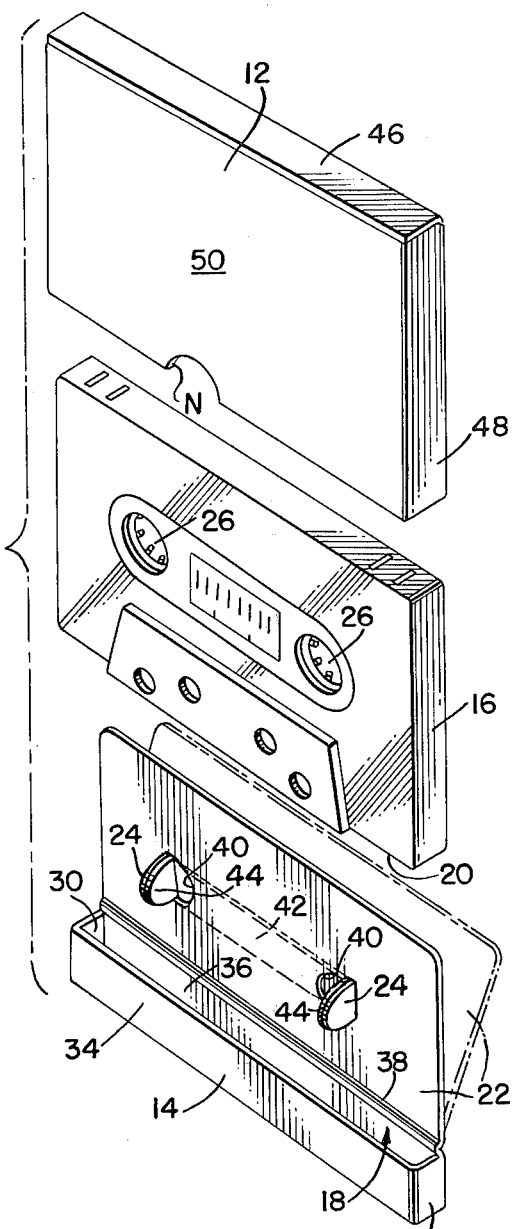
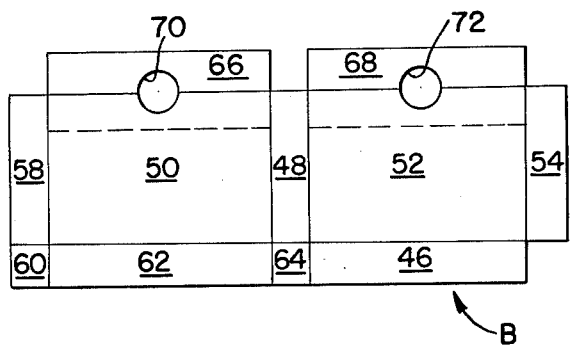
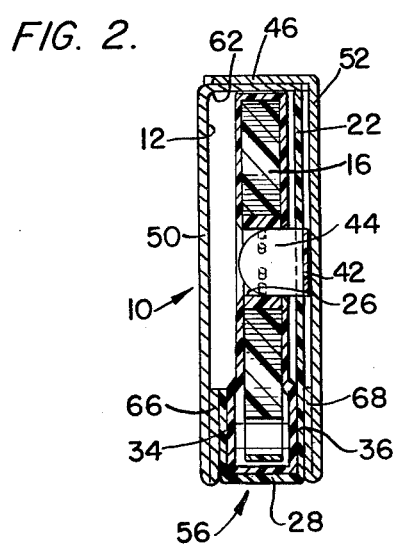
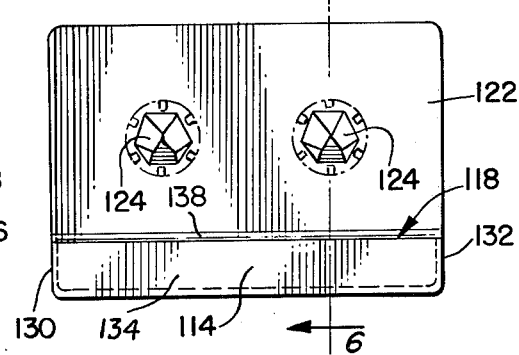
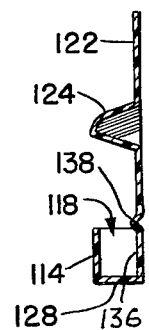

TAPE CASSETTE PACKAGES AND HOLDERS THEREFOR

FIELD OF INVENTION

The present invention relates generally to a tape cassette package and the components in which a tape cassette may be inserted and held to form such a package for shipment and/or storage.

BACKGROUND ART

In the wake of the commercial acceptance of the tape cassette recorder, a substantial body of art has been developed for packaging tape cassettes. Heretofore, a goodly number of the various brands of tape cassettes on the market has been packaged in rigid plastic containers. While the plastic containers are quite adequate insofar as the protection provided thereby is concerned, the availability and cost of raw material are developing into prohibitive factors against continued production of such rigid plastic containers. The foregoing considerations become more apparent when it is observed just how many of the synthetic plastics in use today are petrochemicals or petroleum derivatives. Added to the material costs, the expense of capital machinery and cost of labor in producing hard plastic containers, one can readily appreciate the close profit margin under which the purveyors of tape cassettes, from the manufacturer down to the retailer, must operate.

Paperboard containers have also been used in the packaging of tape cassettes, but such use has not received widespread acceptance, since they tend to deteriorate over a period of use.

SUMMARY OF THE INVENTION

With the above background in mind, Applicant has developed the new tape cassette packaging disclosed herein as a two-piece container, which should alleviate the situation to a considerable extent.

It is, therefore, an object of the present invention to provide an economical yet functional and commercially feasible packaging for tape cassettes.

It is another object of the present invention to provide a new and improved packaging for tape cassettes which will be simple to manufacture without difficulty.

It is yet another object of the present invention to provide a new and improved packaging which will protect exposed tape from damage.

It is still another object of this invention to provide a new and improved cassette container which will include means for locking the tape reel against movement during shipment and/or handling.

It is also an object of the present invention to provide a new and improved container which will be readily adaptable to use with all existing cassettes presently on the market.

A further object of the present invention is to provide a new and improved packaging on which printing or labeling may be readily applied.

It is moreover an object of the present invention to provide a new or improved packaging which may be stacked and machine loaded.

BRIEF DESCRIPTION OF THE DRAWINGS

Referring briefly to the drawings, the reader will see that:

FIG. 1 represents a view in perspective of the package constituting the invention disclosed herein:

FIG. 2 is a sectional view taken along the plane of 2—2 and looking in the direction of the arrows in FIG. 1;

FIG. 3 represents an exploded view in perspective of the various parts of the package illustrated in FIGS. 1 and 2;

FIG. 4 represents a plan view of a blank from which the outer member of the package of FIGS. 1-3 may be formed;

FIG. 5 is a front elevational view of an alternative embodiment of a cassette holder for the package illustrated in FIG. 3; and FIG. 6 is a sectional view taken along the plane 6—6 and looking in the direction of the arrows in FIG. 5.

DETAILED DESCRIPTION OF THE INVENTION

Referring now in detail to the drawings, in particular to FIGS. 1-3; the reader will readily see that in accordance with Applicant's disclosure a new and improved package 10 comprises an outer sleeve or cover 12 and an inner cassette holder 14, which cooperate to enclose therein a tape cassette 16 of known geometrical configuration. The sleeve or cover 12 is made of low-cost paperboard on which information and decorative designs may be printed in contrast to the use of an all plastic package, which would require a separate printed card for providing information. Cassette holder 14 as seen in FIG. 3 comprises an open pocket portion 18 for receiving a tape cassette 16 at the edge 20 along which tape is exposed, a back flap 22, and reel-engaging-and-locking mean in the form of tabs 24 extending forwardly from back flap 22 in the area of reel holes 26 of a tape cassette 16 to be received in pocket portion 18. It is noted that pocket portion 18, back flap 22, and tabs 24 are integrally formed from a single, relatively thin, highly flexible sheet of plastic. Pocket portion 18 includes a bottom wall 28, two side walls 30, 32, a front wall 34, and a back wall 36. The two side walls 30, 32 and front wall 34 extend up from bottom wall 28 to an elevation below that of the reel holes 26 of cassette 16 to be received in pocket portion 18. Back wall 36 and back flap 22 are integral with each other along a hinge line 38 at about the same elevation that two side walls 30, 32 and front wall 34 are above bottom wall 28. Tabs 24 are partially cut out from back flap 22 and bend inwardly therefrom. Tabs 24 comprise two partially cut out members which are spaced-apart from each other and leave a pair of openings 40 also spaced-apart from each other. Partially cut out tab members 24 are reinforced by plastic ribbon element 42 extending against the back side of back flap 22 and having opposite end portions 44 bent into respective ones of the pair of openings 40 and secured to partially cut out members 24 to effect multi-ply tabs. Back flap 22 may be hinged to or from the plane of back wall 36 about hinge line 38 to effect insertion and withdrawal of tabs 24 with respect to reel holes 26 in registration therewith. According to the inventive concept disclosed herein is a package 10 comprising the tape cassette holder 14 as described above in combination therewith an outer sleeve 12 of paperboard material extending around cassette holder 14 and cassette 16 wherein cassette 16 includes an edge 20 along tape which is exposed for recording or playback with edge 20 being disposed against the bottom wall 28 of holder 14 in package 10. Cassette 16, as mentioned above, includes reel holes 26 with tabs 24 extending therethrough. Outer sleeve 12 includes five generally rectangular panels 46, 48, 50, 52, 54 formed from a blank B to define a shape generally conforming to that of a tape cassette 16 and a single opening 56 through which cassette 16 and holder 14 may together be inserted into or withdrawn from outer sleeve 12 with the bottom wall 28 of cassette holder 14 being in full view from the exterior of package 10 when the latter is fully assembled to thereby fully enclose cassette 16. Blank B as seen in FIG. 4 also includes panels 58, 60, 62, 64, 66 and 68. Panels 60 and 64 are integrally hinged to panels 58 and 48, respectively, and are folded under panel 62, which in turn is folded under panel 46 and adhered thereto in the assembled condition of outer sleeve 12 while panel 58 integrally hinged to panel 50 and folded over panel 54 and adhered thereto when sleeve 12 is assembled. Panels 66 and 68 are integrally hinged to panels 50 and 52 except at circular cut-outs 70 and 72. In the assembled condition of sleeve 12, panels 50 and 52 are generally parallel to each other at opposite sides of opening 56 and panels 66 and 68 are folded against the inner surface of panels 50 and 52 as may be seen in FIG. 2 to provide semi-circular notches N, one of which appears in FIG. 1, to enable gripping pocket portion 18 of cassette holder 14 and facilitate withdrawing the latter from outer sleeve 12.

Alternative and Preferred Cassette Holder Form

While cassette holder 14 has been found to be satisfactory in use in package 10, as described above, an alternative and preferred form is illustrated in FIGS. 5 and 6. Instead of reel-engaging-and-locking means of the form of partially cut-out tabs 24 of cassette holder 14, the cassette holder 114 of FIGS. 5 and 6 comprises reel-engaging-and-locking means in the form of hollow cup-shaped members 114. Close observation of FIGS. 5 and 6 will readily show that cassette holder 114 comprises an open pocket portion 118 for receiving a tape cassette 16 at the edge 20 along which tape is exposed, a back flap 122, and hollow cup-shaped reel-engaging-and-locking members 124 extending forwardly from back flap 122 in the area of reel holes 26 of a tape cassette 16 to be received in pocket portion 118. It may also be noted that pocket portion 118, back flap 122, and hollow cup-shaped members 124 are integrally formed from a single, relatively thin, highly flexible sheet of plastic. Pocket portion 118 includes a bottom wall 128, two side walls 130, 132, a front wall 134, and a back wall 136. The two side walls 130, 132 and front wall 134 extend up from bottom wall 128 to an elevation below that of the reel holes 26 of cassette 16 to be received in pocket portion 118. Back wall 136 and back flap 122 are integral with each other along a hinge line 138 at about the same elevation that two side walls 130, 132 and front wall 134 are above bottom wall 128. Hollow cup-shaped reel-engaging-and-locking members 124 are vacuum-formed on back flap 122 highly flexible, relatively thin plastic sheet, along with pocket portion 118. Cup-shaped members 124 as formed are spaced-apart from each other and extend forwardly from the plane of back flap 122. Hollow cup-shaped members 124 may also be seen to each have a multi-facet or gem-like outer surface which is readily received into a cassette reel hole and in engagement with spoke elements of the reel to thereby lock the latter. Back flap 122 may be hinged to or from the plane of back wall 136 about hinge line 38 to effect insertion and withdrawal of cup-shaped members 124 with respect to reel holes 26 in registration therewith. Accordingly, the inventive concept disclosed herein is a package 10 comprising the tape cassette holder 14 or 114 as described above in combination therewith an outer sleeve 12 of paperboard material extending around cassette holder 14 or 114 and cassette 16 wherein cassette 16 includes an edge 20 along tape which is exposed for recording or playback with edge 20 being disposed against the bottom wall 28 or 128 of holder 14 or 114 in package 10.

With the foregoing disclosure in mind, it may now be appreciated that a new and improved package 10 is provided wherein tabs 24 or hollow cup-shaped members 124 formed on hinged back flap 22 or 122, respectively may function to lock the hubs of reels of tape cassette 16 against rotation by extending between opposed radial spokes.

It is to be understood that the invention is not limited to the embodiments disclosed above which are illustratively offered, and that modifications may be made without departing from the scope of the invention.

What is claimed is:

1. A tape cassette holder comprising:
(a) an open pocket portion for receiving a tape cassette at the edge along which tape is exposed,
(b) a back flap, and
(c) reel-engaging-and-locking means extending forwardly from said back flap in the area of at least one reel hole of a tape cassette to be received in said pocket portion; wherein said pocket portion, said back flap, and said reel-engaging-and-locking means are integrally formed from a single sheet member; said pocket portion includes a bottom wall, two side walls, a front wall, and a back wall; said two side walls and said front wall extend up from said bottom wall to an elevation below that of the reel holes of a cassette to be received in said pocket portion; said back wall and said back flap are integral with each other along a hinge line at about the same elevation that said two side walls and said front wall are above said bottom wall; said reel-engaging-and-locking means being deflected out from the plane of said back flap and extending forwardly therefrom; and said back wall about said hinge line for insertion and withdrawal of said reel-engaging-and-locking means with respect to one or more reel holes in registration therewith.

2. The cassette holder of claim 1 wherein said single sheet member from which said holder is formed is of plastic material.

3. The cassette holder of claim 2 wherein said reel-engaging-and-locking means comprise two partially cut out tab members spaced-apart from each other leaving a pair of openings also spaced-apart from each other and a ribbon element extending against the back side of said back flap with opposite end portions bent into respective ones of said pair of openings and secured to said partially cut out tab membes in reinforcing relationship to said tab members.

4. The cassette holder of claim 2 wherein said reel-engaging-and-locking means comprise two hollow cup-shaped members each of which extends forwardly from said back flap and integrally therewith.

5. The cassette holder of claim 4 wherein each of said cup-shaped members has a multi-facet or gem-like outer surface which may engage with spoke elements of a reel hole of a cassette to lock the reel engaged thereby.

6. A package comprising a tape cassette holder as defined in claims 1, 2, 3, 4 or 5 in combination with a tape cassete held thereby and an outer sleeve extending around said holder and said cassette wherein said cassette includes an edge along which is exposed for recording or playback and said edge is disposed against the bottom wall of said holder in said package; said cassette also includes reel holes extending around said reel-engaging-and-locking means; and said outer sleeve includes five generally rectangular panels defining a shape generally conforming to that of a tape cassette and a single opening through which said cassette and holder may together be inserted into or withdrawn from said outer sleeve with the bottom wall of said cassette holder being in full view from the exterior of said package when the latter is fully assembled to thereby fully enclose said cassette.

7. The package as defined in claim 6 wherein said outer sleeve is of paperboard material.

8. The package as defined in claim 6 wherein said plastic sheet member of said cassette holder is highly flexible and relatively thin.

9. The package as defined in claim 6 wherein two of said panels are on opposite sides of said opening, are parallel, and have cut away notches which enable gripping the pocket portion of said cassette holder to facilitate withdrawing the latter from said outer sleeve.

10. The cassette holder of claims 2, 3, 4 or 5 wherein said plastic sheet member of said cassette holder is highly flexible and relatively thin.

* * * * *